United States Patent [19]
Chang et al.

[11] Patent Number: 5,881,180
[45] Date of Patent: *Mar. 9, 1999

[54] METHOD AND APPARATUS FOR THE REDUCTION OF BLOCKING EFFECTS IN IMAGES

[75] Inventors: Ching-Fang Chang, San Jose; Chuen-Chien Lee, Fremont, both of Calif.

[73] Assignees: Sony Corporation, Tokyo, Japan; Sony Electronics, Inc., Park Ridge, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 598,655

[22] Filed: Feb. 8, 1996

[51] Int. Cl.$^6$ .................................................. G06K 9/36
[52] U.S. Cl. ........................................... 382/268; 382/250
[58] Field of Search .................................... 382/250, 268, 382/240

[56] References Cited

U.S. PATENT DOCUMENTS

| | | | |
|---|---|---|---|
| 4,805,129 | 2/1989 | David | 364/724.01 |
| 4,910,594 | 3/1990 | Kondo | 358/138 |
| 5,023,710 | 6/1991 | Kondo et al. | 358/133 |
| 5,049,990 | 9/1991 | Kondo et al. | 358/133 |
| 5,070,403 | 12/1991 | Wilkinson | 358/136 |
| 5,109,451 | 4/1992 | Aono et al. | 382/56 |
| 5,142,537 | 8/1992 | Kutner et al. | 371/31 |
| 5,220,616 | 6/1993 | Downing et al. | 382/54 |
| 5,272,536 | 12/1993 | Sudo et al. | 358/213.15 |
| 5,335,019 | 8/1994 | Herz et al. | 348/607 |
| 5,337,088 | 8/1994 | Honjo | 348/420 |
| 5,351,083 | 9/1994 | Tsukagoshi | 348/384 |
| 5,381,354 | 1/1995 | Soloff | 364/724.01 |
| 5,422,964 | 6/1995 | Devimeux et al. | 382/226 |
| 5,450,506 | 9/1995 | Gillard et al. | 382/309 |
| 5,537,493 | 7/1996 | Wilkinson | 382/240 |
| 5,590,064 | 12/1996 | Astle | 364/715.02 |

FOREIGN PATENT DOCUMENTS

| | | |
|---|---|---|
| 571171A2 | 5/1993 | European Pat. Off. . |
| 590922A2 | 9/1993 | European Pat. Off. . |
| 680217A2 | 4/1995 | European Pat. Off. . |
| 680219A2 | 5/1995 | European Pat. Off. . |
| 4128977A | 8/1991 | Sweden . |
| 2287153 | 9/1995 | United Kingdom . |
| 9119271 | 12/1991 | WIPO . |

OTHER PUBLICATIONS

Avideh Zakhor, "Iterative Procedures for Reduction of Blocking Effects in Transform Image Coding", Jun. 10, 1991, pp. 91–95.

International Telecommunication Union, "Line Transmission on Non–Telephone Signals", Mar. 1993, pp. 1–25.

International Search Report Dated Jun. 10, 1997 for PCT Patent Application No. PCT/US 97/00499 filed Jan. 10, 1997.

International Search Report Dated Jun. 10, 1997 for PCT Patent Application No. PCT/US 97/00737 filed Jan. 10, 1997.

International Search Report Dated Jun. 30, 1997 for PCT Patent Application No. PCT/US 97/03292 filed Mar. 3, 1997.

"An Adaptive Image Quality Improvement Method for DCT Coding Schemes," *PCS '93 1993 Picture Coding Symposium Proceedings,* Mar. 17–19, 1993 Swiss Federal Institute of Technology, Lausanne—Switzerland, 3 pages.

Patent Abstracts of Japan, Publication No. 07087500, Mar. 31, 1995, "Method for Post–Processing for Decoded Picture Signal," 1 page.

*Primary Examiner*—David K. Moore
*Assistant Examiner*—Stephen Brinich
*Attorney, Agent, or Firm*—Blakely, Sokoloff, Taylor & Zafman LLP

[57] ABSTRACT

A method and apparatus to post process decompressed image data to minimize blocking effects without affecting the sharpness of the image.

17 Claims, 4 Drawing Sheets

METHOD AND APPARATUS FOR THE REDUCTION OF BLOCKING EFFECTS IN IMAGES

BACKGROUND OF THE INVENTION

1. Field of the Invention

The present invention relates to the removal of blocking effects in mages previously compressed and decompressed. More particularly, the present invention relates to the removal of blocking effects in images compressed in accordance with MPEG, JPEG and other DCT based formats.

2. Art Background

The need to compress digital image data, whether static or dynamic (i.e., video images) images has dramatically increased. One reason is the dramatic popularity of multimedia computer systems and software. Another reason is switch to digital broadcasts of station programming. One example of the latter is direct satellite broadcasts, such as DSS™. In order to minimize the bandwidth required to transmit broadcasts of programs or to minimize the amount of storage space required to store certain images, compression techniques are utilized. Thus, the image data is transmitted or stored in a compressed format and prior to the display of the image, the image data is decompressed. Examples of widely utilized compression algorithms are those that comply with the MPEG (Moving Pictures Experts Group) and JPEG (Joint Picture Experts Group) standards.

Many compression processes, including those that comply with MPEG or JPEG standards, utilize transform coding. In a transform coding process, an image is divided into small blocks. The transform of each block is taken, the coefficients of which are quantized in accordance with a determined quantization factor q. The most popular transform is the discrete cosine transform (DCT).

However, one negative effect of the process is referred to as the "blocking effect". By dividing the image into blocks prior to encoding, discontinuities (referred to as blocking effects) between adjacent blocks occurs through the encoding and decoding process. This is represented in a displayed decompressed image by clear jumps between colors or greyscales as opposed to a smooth change.

Pre-processing and post-processing techniques are utilized to minimize blocking effects. Pre-processing techniques dictate that the originator of the image data must perform certain steps to minimize blocking effects. Post-processing techniques, although logistically better as the correction is performed after decompression, has its problems. For example, one of the simplest techniques is to process the decompressed image data through a low pass filter. Although the blocking effects are decreased, the sharpness of the displayed image is negatively affected.

SUMMARY OF THE INVENTION

The method and circuit of the present invention post processing is performed on decompressed image data to minimize blocking effects without affecting the sharpness of the image. The image data is first processed through a low pass filter. A discrete cosine transform (DCT) is performed on the filtered data and a copy of the original data to place both in the frequency domain. The filtered data is then adjusted to minimize blocking effects by constraining the values of DCT coefficients to be within ranges dictated by the quantization values used in the original compression process. The adjusted data is then combined with the original image data and the combined image data is processed by an inverse discrete cosine transform (IDCT) to place the image data back into the spatial domain for subsequent processing to display the image.

BRIEF DESCRIPTION OF THE DRAWINGS

The objects, features and advantages of the present invention will be apparent to one skilled in the art in light of the following detailed description in which.

DETAILED DESCRIPTION

The present invention provides a simple but effective apparatus and method for minimizing blocking effects that occur in discrete cosine transform images. In the following description, for purposes of explanation, numerous details are set forth, in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

Figure 1:
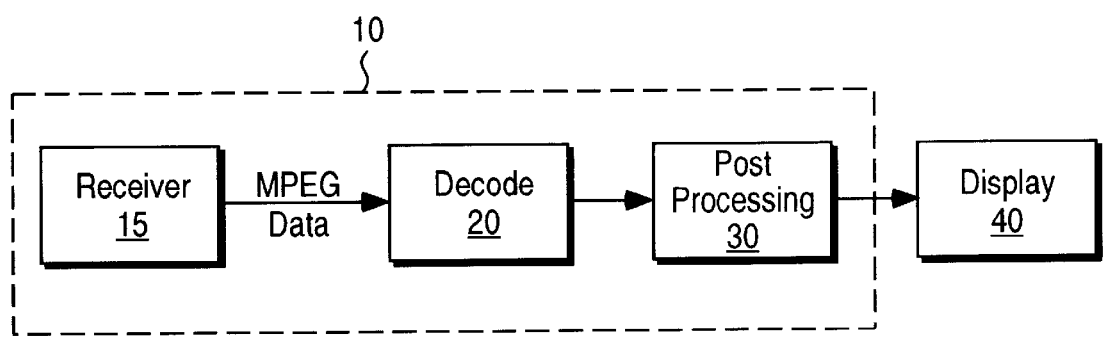
FIG. 1 is a simplified block diagram of a system that operates in accordance with the teachings of the present invention.

A simplified block diagram of an exemplary system that operates in accordance with the teachings of the present invention is illustrated in FIG. 1. To minimize on transmission bandwidth and/or to save on the amount of space required to store an image, the image is frequently formatted in a compressed form which utilizes discrete transforms. Popular examples of formats include those that comply with the JPEG (Joint Picture Experts Group) and MPEG (Motion Picture Experts Group) standards. The system illustrated includes the receiver/display system 10 and display 40. One example of a receiver/display system 10 is a Video CD player. Another example is a direct satellite receiver such as one manufactured by Sony Corporation. Other types of receivers/players/storage/display systems are also contemplated.

The receiver 10 receives the compressed image. The receiver may be one of many types of receiving devices configured to receive image data. Alternately, the receiver may be one to receive television broadcast signals or a device coupled to directly to a storage unit (e.g., memory, VCR, CD ROM or the like) to receive images retrieved from storage. For purposes of explanation, the image data is received in a format compatible with the MPEG specification; however, the other types of compressed formats that use discrete transforms to compress the data can also be used.

Once the image data is received, the data is decoded (i.e., decompressed) by decoder 20 and processed by post-processor 30 in order to remove blocking effects created by the encoding and decoding processes. The modified image data subsequently displayed by display subsystem 40 shows an image in which the blocking effects are minimized.

It has been determined that quantization of low frequency discrete cosine transform (DCT) coefficients is one of the significant factors that contributes to the blocking effect, while quantization of high frequency DCT coefficients contributes very little to the blocking effect. However, the high frequency DCT coefficients contribute to the sharpness of the image. Thus the present invention takes advantage of the this determination to process the low frequency coefficients and high frequency coefficients differently. The post-processing technique discussed below successfully reduces the strength of the blocking effect while preserving the sharpness of the image.

Figure 2A:
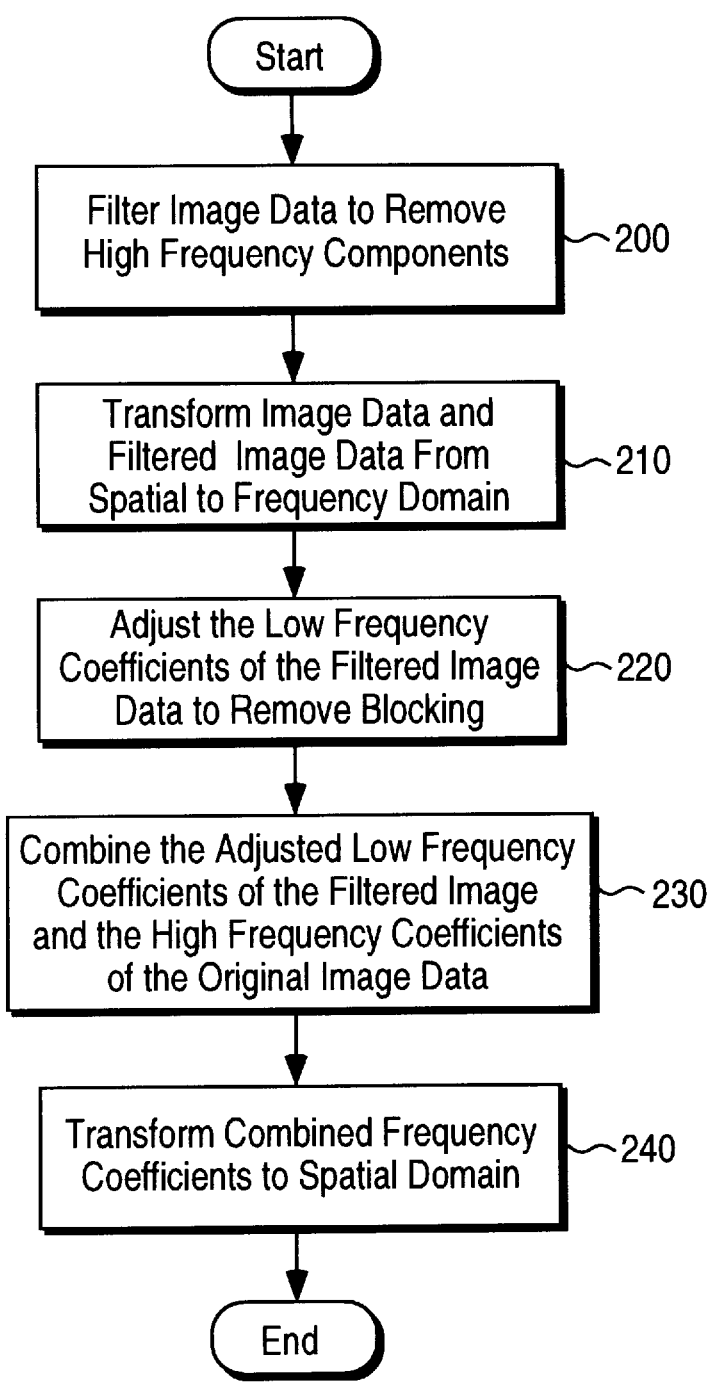
FIG. 2a is a flow chart depicting the process for minimizing blocking effects and FIG. 2b is an image diagram for one block illustrating pictorially the data flow of the process for minimizing blocking effects.

The focus of the discussion now turns to the post-processing technique performed to remove the blocking effects. Referring to the flow chart of FIG. 2a and the image diagram of FIG. 2b, at step 200, the image data received is filtered to remove high frequency components to enable subsequent processing of the low frequency components that significantly contribute to the blocking effect. The cutoff frequency of the filter is chosen such that most of the blocking effects are removed. For example, in the current embodiment, at the cost of sharpness, a 7×7 medium filter is used. For more information on median filters, see, for example, Anil K. Jain, *Fundamentals of Digital Image Processing* (1989 Prentice-Hall Inc.) pp 244–249.

Preferably, the selection of the coefficients identified the low frequency coefficients (e.g., A, C, FIG. 2b) and correspondingly the selection of the coefficients identified as high frequency coefficients (e.g., B, D, FIG. 2b) is determined empirically according to the best results achieved. For example, as illustrated in FIG. 3, an 8×4 block 360 is preferably divided into low frequency coefficients 370 and high frequency coefficients 380.

Once the high frequency elements have been removed, at step 210, the filtered image data is transformed from the spatial domain to the frequency domain. Similarly, the original image data that includes both the high frequency and low frequency components is transformed from the spatial domain to the frequency domain. Preferably a DCT is applied to the image data to transform the image to the frequency domain. As is known in the art (see e.g., K. R. Rao, P.Y.P. Discrete *Cosine Transform, Algorithms, Advantages, Applications* (Academic Press, 1990), p.173,) the DCT produces low frequency coefficients and high frequency coefficients.

Figure 2B:
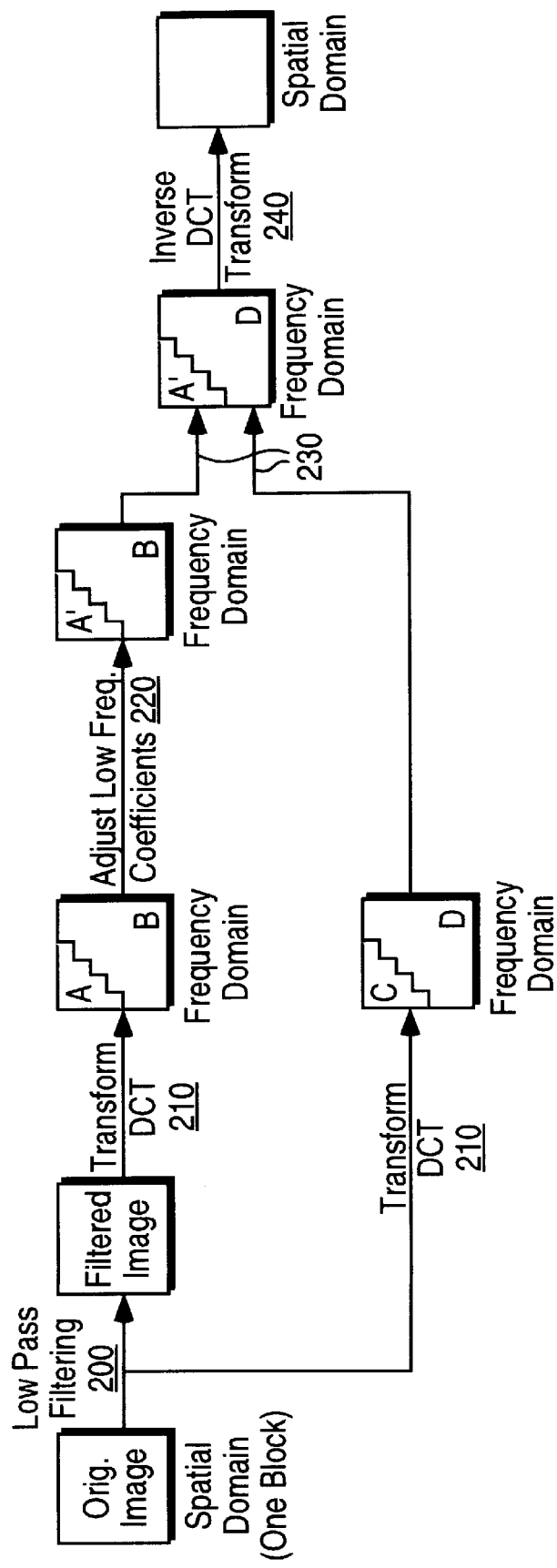
Figures 3, 4:
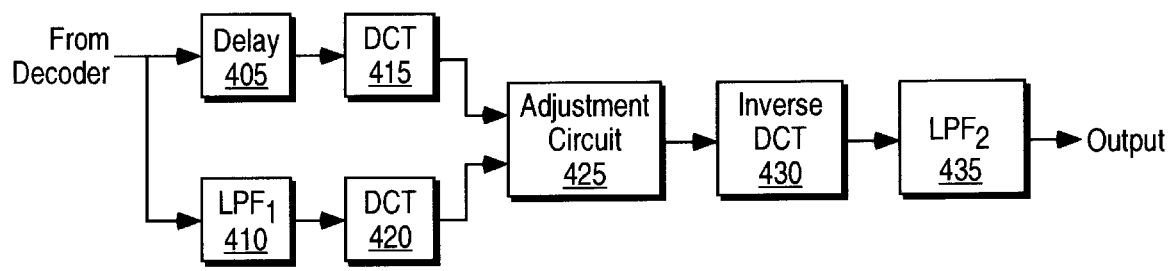
FIG. 3 is a diagram illustrating the low frequency coefficients and high frequency coefficients of an 8×4 block processed through a DCT.
FIG. 4 is a simplified block diagram of a circuit that performs a process for minimizing blocking effects.

At step 220, in the frequency domain, the low frequency components of the filtered image is adjusted to remove blocking effects (A', FIG. 2b). It is contemplated that a variety of adjustment processes can be applied to adjust the low frequency coefficients to remove blocking effects; however, in the present embodiment, the coefficients are adjusted to be within the range of possible original values for a particular quantized value. More particularly, the low frequency coefficients are adjusted according to the following criteria:

if $X-q/2 \leq Y \leq X+q/2$, then Y is the adjusted value;

if $Y > X+q/2$, then $X+q/2$ is the adjusted value; and if $Y < X-q/2$, then $X-q/2$ is the adjusted value;

wherein X is the quantized coefficient value, Y is coefficient value of an element in the filtered image, and q is a step size, associated with the frequency coefficients, used (also referred to as the quantization value) in a quantization process utilized in the coding process. Thus, it can be seen that the adjustments are limited to the range of (X−q/2, X+q/2).

Once the low frequency coefficients of the filtered image have been adjusted, the low frequency coefficients of the adjusted, filtered image and the high frequency coefficients of the original image are combined to form one set of frequency coefficients. Preferably, this is achieved by appropriately filtering the adjusted filtered image and the original image to isolate the low frequency coefficients and high frequency components, respectively, and generating a combined image consisting of the low frequency coefficients from the adjusted filtered image and the high frequency coefficients from the original image, step 230. The combined frequency coefficients are then transformed back to the spatial domain, step 240. Once back in the spatial domain, the image can be processed for display. The resulting image displayed will reveal minimal blocking effect while maintaining a sharp image.

Preferably, the combined image is process through a low pass filter after transformation to the spatial domain. This has been found to improve the image slightly to remove some high frequency artifacts created by combining the original image data and the adjusted image data. The cutoff frequency of the filter is chosen such that only very high frequency components are removed, while sharpness is preserved as much as possible. In the present embodiment, a 3×3 median filter is used.

A simplified block diagram of an exemplary post processing circuit is illustrated in FIG. 4. It is apparent that the circuit can be implemented a variety of ways to achieve the postprocessing function. For example, the process can be implemented in a general purpose or dedicated computer system executing software to perform the steps described.

Referring now to FIG. 4, the post processing circuit includes a delay 405, first low pass filter (LPF) 410, DCTs 415, 420, adjustment subcircuit 425, inverse DCT 430 and second LPF 435.

The first LPF 410 functions to filter out the high frequency components from the image data. As the filtered image data and original image data are subsequently input to the adjustment circuit 425, a delay 405 is preferably placed in the circuit to keep the original image data in synchronization with the filtered image data. Thus, the length of the delay 405 is approximately equal to the amount of time it takes to process the image data through the LPF 410. Both the original image data output by delay 405 and the filtered image data output by LPF 410 are input to a DCT 415, 420 to transform the image data from the spatial domain to the frequency domain. Although the DCT 415, 420 is shown as two separate blocks, it readily apparent that the DCT functionality can be provided in a single block.

The transformed image data is input to the adjustment sub-circuit 425 which adjusts the low frequency coefficients of the filtered image to remove blocking effects and combines the low frequency coefficients of the adjusted image data and the high frequency coefficients of the original image data into one set of frequency coefficients. The inverse DCT circuit 430 transforms the combined frequency coefficients into the spatial domain. The image data is then processed through low pass filter 435 to remove the artifacts caused by combine the adjusted and original image data.

The invention has been described in conjunction with the preferred embodiment. It is evident that numerous alternatives, modifications, variations and uses will be apparent to those skilled in the art in light of the foregoing description.

What is claimed is:

1. A method for minimizing blocking effects in an image described by image data, said method comprising the steps of:

filtering the image data to remove high frequency components above a first identified threshold to generate a filtered image data;

transforming unfiltered image data and the filtered image data from a spatial domain to a frequency domain;

adjusting low frequency coefficients of the transformed filtered image data to minimize blocking effects;

combining high frequency components of the transformed unfiltered image data and the adjusted low frequency coefficients of the transformed filtered image data to generate adjusted combined frequency coefficients; and transforming the adjusted combined frequency coefficients from the frequency domain to the spatial domain.

2. The method as set forth in claim 1, further comprising the step of filtering the transformed adjusted combined image data to remove artifacts caused by high frequency components above a second identified threshold.

3. The method as set forth in claim 2, wherein the second identified threshold is greater than the first identified threshold.

4. The method as set forth in claim 1, wherein the first identified threshold is chosen to remove a desired portion of the blocking effects, at the cost of sharpness of the image.

5. The method as set forth in claim 2, wherein the second identified threshold is chosen such that only very high frequency components are removed, while sharpness of the image is preserved as much as possible.

6. The method as set forth in claim 1, wherein the step of transforming the image data and filtered image data from the spatial domain to the frequency domain comprises the steps of coding according to a quantization process using a step size q and performing a discrete cosine transform (DCT).

7. The method as set forth in claim 6, wherein the step of transforming from the frequency domain to the spatial domain comprises the step of performing an inverse discrete cosine transform (IDCT).

8. The method as set forth in claim 6, wherein the step of adjusting comprises comparing DCT components of the transformed filtered image data (Y) to DCT components of the transformed image data (X) and adjusting the DCT components of the transformed filtered image data according to the following rules:

if $X-q/2 \leq Y \leq X+q/2$, then Y is the adjusted value;

if $Y>X+q/2$, then $X+q/2$ is the adjusted value; and if $Y<X-q/2$, then $X-q/2$ is the adjusted value;

wherein q is a step size used in a quantization process utilized in the coding process and the adjustments are limited to the range of (X−q/2, X+q/2).

9. A circuit for minimizing blocking effects in an image described by image data, said method comprising the steps of:

a first low pass filter coupled to receive the image data and output filtered image data;

a spatial transform coupled to receive the filtered image data and unfiltered image data to respectively transform the unfiltered image data and the filtered image data from a spatial domain to a frequency domain the coefficients of the spatial transform quantized in accordance with a step size q;

an adjustment subcircuit coupled to receive the transformed filtered image data and transformed unfiltered image data, said adjustment subcircuit adjusting the low frequency coefficients of the transformed filtered image data to minimize blocking effects and combine the transformed high frequency coefficients of the transformed unfiltered image data and the adjusted low frequency coefficients of the transformed filtered image data to generate an adjusted combined frequency coefficients; and a frequency transform coupled to receive the adjusted combined frequency coefficients, said transform transforming the adjusted combined frequency coefficients from the frequency domain to the spatial domain.

10. The circuit as set forth in claim 9, further comprising a second low pass filter coupled to receive the transformed adjusted combined image data, said second low pass filter outputting filtered data.

11. The circuit as set forth in claim 10, wherein a cutoff frequency of the second low pass filter is higher than a cutoff frequency of the first low pass filter.

12. The circuit as set forth in claim 9, wherein a cutoff frequency of the first low pass filter set to a frequency to remove a desired portion of the blocking effects, at the cost of sharpness of the image.

13. The circuit as set forth in claim 10, wherein a cutoff frequency of the second low pass filter is set to a frequency such that only very high frequency components are removed, while sharpness of the image is preserved as much as possible.

14. The circuit as set forth in claim 9, wherein the spatial transform comprises a discrete cosine transform (DCT).

15. The circuit as set forth in claim 9, wherein the frequency transform comprises an inverse discrete cosine transform (IDCT).

16. The circuit as set forth in claim 9, wherein the spatial transform comprises a first and second discrete cosine transform (DCT) subcircuits, said first and second DCT subcircuits coupled to respectively receive the transformed image data and transformed filtered image data.

17. The circuit as set forth in claim 14, wherein the adjustment circuit comprises logic to compare DCT components of the transformed filtered image data (Y) to DCT components of the transformed image data (X) and adjust the DCT components of the transformed filtered image data according to the following rules:

if $X-q/2 \leq Y \leq X+q/2$, then Y is the adjusted value;

if $Y>X+q/2$, then $X+q/2$ is the adjusted value; and if $Y<X-q/2$, then $X-q/2$ is the adjusted value;

wherein q is a step size used in a quantization process utilized in the coding process and the adjustments are limited to the range of (X−q/2, X+q/2).

* * * * *